United States Patent [19]
Klement et al.

[11] 3,803,078
[45] *Apr. 9, 1974

[54] PROCESS AND COMPOSITION FOR BONDING VULCANIZABLE RUBBER COMPOSITIONS TO A SUBSTRATE BASED ON TRIGLYCIDYL ISOCYANURATES

[75] Inventors: Günter Klement; Manfred Budnowski, both of Dusseldorf-Holthausen; Veit Lachmann, Monheim, all of Germany

[73] Assignee: Henkel & Cie GmbH, Dusseldorf, Germany

[ * ] Notice: The portion of the term of this patent subsequent to Dec. 26, 1989, has been disclaimed.

[22] Filed: Aug. 17, 1971

[21] Appl. No.: 172,580

[30] Foreign Application Priority Data
Aug. 19, 1970 Germany............................ 2041126

[52] U.S. Cl.....................260/31.2 N, 260/32.8 N, 260/33.8 UR, 260/37 N, 260/858, 260/859
[51] Int. Cl................................................ C08 51/36
[58] Field of Search. 260/77.5 AT, 77.5 NC, 47 EP, 260/31.2 N, 858, 859, 33.8 UR, 32.8 N, 37 ED, 37 N

[56] References Cited
UNITED STATES PATENTS
3,707,527  12/1972  Budnowski................. 260/77.5 NC
3,632,665  1/1972  Aggias............................. 260/830
3,656,624  4/1972  Saran........................ 260/77.5 NC
3,459,713  8/1969  Saran............................. 260/77.5
3,536,669  10/1970  Kleinschmidt.................. 260/77.5
3,487,126  12/1969  Carter............................. 260/859
3,381,056  4/1968  Beer............................... 260/859
3,594,449  7/1971  Bender............................ 260/859

Primary Examiner—Morris Liebman
Assistant Examiner—Richard Zaitlen
Attorney, Agent, or Firm—Hammond & Littell

[57] ABSTRACT

An adhesion assistant or binder for use in the production of composite bodies by vulcanizing a vulcanizable rubber mixture on a substrate which is stable under vulcanization conditions consisting essentially of from 5 percent to 50 percent by weight of the reaction product of a solid triglycidyl isocyanurate with 1 mol for each epoxide group in said triglycidyl isocyanurate of an organic diisocyanate free of other substituents capable of reacting with epoxide oxygen, and optionally other known customary adhesive auxiliaries, and from 50 to 95 percent by weight of an organic solvent; as well as the method of bonding a vulcanizable rubber mixture on a substrate which is stable under vulcanization conditions.

8 Claims, No Drawings

PROCESS AND COMPOSITION FOR BONDING VULCANIZABLE RUBBER COMPOSITIONS TO A SUBSTRATE BASED ON TRIGLYCIDYL ISOCYANURATES

THE PRIOR ART

The use of polyisocyanates, especially triphenylmethane triisocyanate, as an adhesive in the vulcanization of rubber mixtures on metals is known. Good rubber-to-metal bonds can be made by this process. However, the high sensitivity of the metal parts coated with isocyanate to moisture in the air, which may lead to a destruction of the bond, is a disadvantage. Furthermore, particularly when modern vulcanization processes are used, such as transfer and injection molding processes, the adhesive, owing to its low cohesion strength, is seized by the rubber mixture entering the mold and is stripped from the metal part to be bonded. Owing to this, defective bonds and considerable contaminations of the mold are also caused. By mixing the isocyanate with a chlorine-containing polymer such as chlorinated rubber, these phenomena can be reduced to a certain extent, but cannot be completely eliminated.

In addition, the use of compositions containing dinitroso compounds, such as dinitrosobenzene, chlorine-containing polymers such as chlorosulfonated polyethylene and dianisidine diisocyanate, as adhesives is also known. Owing to the small activity of the special isocyanate, such mixtures are indeed stable for a relatively long time, but they present difficulties during working. Thus, owing to the tendency of the isocyanate to bloom during drying of the film, layers of heterogeneous composition result, which may lead to bonding difficulties.

OBJECTS OF THE INVENTION

An object of the present invention is to find adhesive aids or assistants which make use of the advantages of the isocyanates for a rubber-to-metal bond without having the said disadvantages.

Another object of the present invention is to develop an adhesive assistant or binder for use in the production of composite bodies by vulcanizing a vulcanizable rubber mixture on a substrate which is stable under vulcanization conditions consisting essentially of from 5 percent to 50 percent by weight of the reaction product of a solid triglycidyl isocyanate with 1 mol for each epoxide group in said triglycidyl isocyanate of an organic diisocyanate free of other substituents capable of reacting with epoxide oxygen, and optionally other known customary adhesive auxiliaries, and from 50 percent to 95 percent by weight of an organic solvent.

A further object of the present invention is the development of a process for the production of a composite body comprising applying a layer of the above adhesion assistant or binder composition to a substrate which is stable under vulcanization conditions and allowing the same to dry, applying a second layer of a vulcanizable rubber composition to said coated substrate, subjecting the composite to vulcanization conditions and recovering said composite body.

These and other objects of the invention will become more apparent as the description thereof proceeds.

DESCRIPTION OF THE INVENTION

The present invention provides an adhesion assistant or binder for use in the production of composite bodies by vulcanizing a vulcanizable rubber mixture on a metal or other substrate which is stable under vulcanization conditions, said assistant or binder comprising a solution or dispersion of a product of addition of a solid triglycidyl isocyanurate to an organic diisocyanate in the molar ratio of 1:3, and optionally further known customary auxiliaries.

In a further aspect of the present invention there is provided a process for the production of a composite body comprising the steps of; providing, on a substrate which is stable under vulcanizing conditions, a first layer of an adhesion assistant or binder as described immediately above, applying thereon a second layer of a vulcanizable rubber composition and subjecting the so coated substrate vulcanizing conditions.

For the preparation of the said addition products, the starting point is suitably solid triglycidyl isocyanurate, preferably a crystalline triglycidyl isocyanurate which contains at least 14 percent of epoxide oxygen as, for example, is described in U.S. Pat. No. 3,337,509. In general the commercial product is used which contains more than 15 percent of epoxide oxygen and is a mixture of the high-and-low-melting isomeric forms.

The addition product of solid triglycidyl isocyanurate with 1 mol for each epoxide oxygen in the solid triglycidyl isocyanurate, of an organic diisocyanate free of the other substituents capable of reacting with epoxide oxygen is described in the commonly-assigned U.S. Patent Application Ser. No. 98,866, filed Dec. 16, 1970, and now U.S. Pat. No. 3,707,527. Since crystalline triglycidyl isocyanurate having an epoxide oxygen content in excess of 14 percent is substantially pure triglycidyl isocyanurate having 3 epoxide oxygen groups per molecule, the same is reacted with the diisocyanates in a molar ratio of 1:3.

The organic diisocyanates free of other substituents capable of reacting with epoxide groups are well known. Commercial types of these diisocyanates are suitable for the preparation of the reaction products.

Preferably, these compounds have the formula

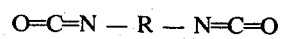

$$O=C=N - R - N=C=O$$

wherein R is a bivalent linkage selected from the group consisting of alkylene having from four to 18 carbon atoms, phenylene, naphthylene, diphenylenemethane and diphenylene, and their lower alkylated, lower alkoxylated and amino derivatives as well as methylenecyclohexyl and its lower alkylated derivatives. Of interest are, for instance, the isomeric toluylenediisocyanates both in mixtures and in the form of the pure isomers, 4,4'-diphenylmethanediisocyanate, dianisidinediisocyanate, the isomeric naphthylenediisocyanates, 3-isocyanatomethyl-3,5,5-trimethylcyclohexylisocyanate, the so-called isophoronediisocyanate, hexamethylenediisocyanate, decamethylenediisocyanate, and trimethylhexamethylenediisocyanate. Generally, only a definite diisocyanate is utilized in order to obtain defined reaction products. The diisocyanates may, however, also be applied in a mixture, particularly the isomeric toluyenediisocyanates.

The reaction between crystalline triglycidyl isocyanurate and the diisocyanates, which is not the subject matter of this application, is carried out with the exclusion of moisture. The reaction temperature is between about 100° C and below the decomposition temperature of the reactants, preferably approximately between 100° and 160° C. Reaction times of about 2 to 20 hours are required. In some cases it may be appropriate to speed up the reaction by the addition of catalysts. For this, small amounts of from 0 to 0.5 percent by weight of the triglycidyl isocyanurate, of catalysts are utilized, for instance, tertiary amines, quaternary ammonium salts, lithium salts, or cobalt salts.

The addition products of triglycidyl isocyanurate to be used according to the invention in the adhesion assistants or binders are trifunctional isocyanates with an extremely low vapor pressure. Owing to the low vapor pressure, problems owing to vaporization of isocyanate is largely avoided.

If the polyisocyanates to be used according to the invention are used as the only active component of the rubber-to-metal binder, it is advisable to apply the polyisocyanates in the form of a solution or dispersion in an organic solvent, as for example in ketones or esters, preferably lower alkanones, cycloalkanones and lower alkyl lower alkanoates such as methylethylketone, methylisobutylketone, ethyl acetate, butyl acetate, possibly in admixture with further solvents liquid at room temperture and inert towards the isocyanate group, such as chlorinated hydrocarbons or fluorinated hydrocarbons. Such a solution or dispersion preferably contains from 5 to 50 percent of the polyisocyanates.

Halogenated polymers may be used as further film-forming components of the adhesion assistant or binder according to the invention. Examples of suitable polymers are chlorosulfonated polyalkylenes such as chlorosulfonated polyethylene, preparable, for example, according to the U.S. Pat. No. 2,405,971. Chlorinated elastomers, may also be used such as chlorinated rubber, chlorinated ethylene-propylene-rubber or chlorinated ethylene-propylene-diene-terpolymerizates, which contain as the ter-component, dicyclopentadiene, ethylidenenorbornene, 1,5-hexadiene or cyclooctadiene-1,5.

Moreover, the adhesion assistant or binder according to the invention may contain, in addition to the polyisocyanates, still further active cross-linking agents such as poly-C-nitroso aromatic compounds, polyesters containing OH groups and polyvalent acrylic or methacrylic acid esters up to a proportion by weight of polyisocyanate to further active cross-linking agent of 1 : 1. Preferred poly-C-nitroso aromatic compounds are especially dinitrosobenzenes and naphthalenes, such as m- or p- dinitrosobenzene or m- or p- dinitrosonaphthalene. Aromatic nitroso compounds which contain three or more nitroso groups, especially those having a benzene or naphthalene ring, may also be used. The hydrogen atoms of the aromatic nucleus may also be replaced by alkyl, cycloalkyl, or arylalkyl groups or halogen atoms.

Further active cross-linking agents may be, for example, a polyester containing OH groups derived an excess of polyhydric alcohols particularly lower alkanepolyols such as ethylene glycol, glycerine, trimethylolpropane with aliphatic and/or aromatic polycarboxylic acids, such as alkanedioic acids, benzene polycarboxylic acids, alkenedioic acids, alkanetrioic acids, etc. Suitable polyesters generally have an OH value between about 30 and 120. Finally, acrylic or methacrylic esters of polyhydric alcohols, particularly lower alkanepolyols such as trimethylolpropane, neopentylglycol, glycerine or propanediol, having more than one acrylic or methacrylic ester group in the molecule are also suitable.

According to a preferred form of the invention, the adhesion assistant or binder contains, as active ingredients:

a. from 20 to 90 percent by weight of a product of addition of triglycidyl isocyanurate to a diisocyanate
b. from 3 to 50 percent by weight of a chlorinated polymer
c. from 0.5 to 20 percent by weight of a further active cross-linking agent, especially a poly-C-nitroso aromatic compound, the percentages given relating to the total solid content.

Additional binder components may also include certain resins and substances for producing tackiness such as chlorinated aliphatic or aromatic hydrocarbons (chlorinated polyphenyls) or phenol-formaldehyde resins, resorcinol-formaldehyde resins or mixed condensates from resorcinol, phenol and formaldehyde, as well as coumarone-indene resins or terpene-phenol resins. In addition to the above-mentioned components, fillers for further reinforcement may be added to the adhesion assistant or binder according to the invention. These, however, should not exceed 25 percent of the total solid content of the adhesion assistant and examples thereof are zinc oxide, silicon dioxide, titanium dioxide, lead oxide, iron oxide, chromium oxide and the various types of carbon blacks. In the case of the latter, the types usual in the rubber industry are suitably used.

For the preparation of the adhesion assistants or binders, the separate components are first dissolved or suspended in an organic solvent. Preferred solvents liquid at room temperature are aromatic hydrocarbons such as xylene or toluene or chlorinated hydrocarbons such as trichloroethylene, perchloroethylene, chlorobenzene or ketones or esters preferably lower alkanones, cycloalkanones, lower alkyl lower alkanoates and lower alkyl lower alkanedioates such as methylethylketone, diethylketone, ethyl acetate, ethyleneglycol diacetate and butyl acetate. The quantity of solvent used may vary over a moderate range. Generally, however, the amount used is such that the adhesion assistant or binder has a solid content of from 5 to 50 percent.

Preferably, therefore, the adhesion assistant or binder composition of the invention has the formulation:

A. from 5 to 50 percent of binder ingredients of the composition adding up to 100 percent of binder ingredients of
   1. from 20 to 100 percent by weight of a product of addition of triglycidyl isocyanurate to an organic diisocyanate,
   2. from 0 to 50 percent by weight of a chlorinated polymer,
   3. from 0 to 20 percent by weight of a further active crosslinking agent, especially a poly-C-nitroso aromatic compound,
   4. from 0 to 20 percent by weight of additional binder or film-forming components, and
   5. from 0 to 25 percent by weight of fillers, and
B. from 50 to 95 percent by weight of organic solvents.

Thus the solutions or dispersions ready for application have a solid content of 5 to 50 percent, preferably 20 to 50 percent. The application of the binder is effected by brushing, dipping or spraying. After evaporation of the solvent or suspension medium a hard, firmly adhering, tough film is formed, which, even at elevated temperature, is removed from the foundation only with great difficulty. Depending on the structure of the diisocyanate used for the preparation of the addition product, the binder films are storable for several days under the usual room conditions, without losing their ability to enter into firmly adhering rubber-to-metal bonds.

After joining together the metal or other substrate thus previously treated and the vulcanizable rubber mixture, the two parts are suitably exposed to vulcanization conditions under a certain pressure. Depending on the vulcanizable rubber mixture, the temperature lies between about 120° to 220° C and the period of treatment lies between about 5 minutes and an hour. The vulcanization conditions depend on the vulcanizable rubber mixtures used and are selected taking into account the thermal stability of the substrate to be bonded.

The adhesion assistants or binders according to the invention are suitable for bonding natural or synthetic rubber to metals and other solid substrates, such as plastics, wood, glass and textile fabrics, within the scope of the vulcanization conditions of the rubber mixtures. The binders are also suitable for bonding different rubber mixtures to one another. They are thus marked by a great versatility of application. The bonds so obtained are marked by a high bond strength and a high resistance to corrosive media as well as to technical oils and fats, as a function of the composition of the special adhesion assistant mixture in question.

The composite bodies thus obtainable can be used in a large number of technical fields, especially in the car industry, in the construction of apparatus for the making of composite parts or in the building sector. Such compound bodies are known as flexible bearings, couplings, shock absorbers, rollers, rubberized containers, axle ring seals and the like.

The following specific examples are illustrative of the invention without being limative in any respect.

EXAMPLES

In the following Examples the vulcanizable rubber mixtures denoted below by A, B, C, D, E and F were vulcanized on substrates. The composition of the mixture and the vulcanization conditions are indicated below.

Mixture A
 100 parts by weight of natural rubber
 10 parts by weight of zinc oxide
 2 parts by weight of stearic acid
 1 parts by weight of phenyl-β-naphthylamine
 2 parts by weight of pine tar
 25 parts by weight of EPC carbon black
 0.33 parts by weight of Zn-dimethyldithiocarbamate
 0.58 parts by weight of dibenzothiazyldisulfide
 2.75 parts by weight of sulfur
Vulcanization conditions: 10 minutes at 153° C.

Mixture B
 120 parts by weight of styrene butadiene rubber
 6 parts by weight of zinc oxide
 1.2 parts by weight of stearic acid
 60 parts by weight of HAF carbon black
 9.6 parts by weight of saturated polymeric groundnut oil hydrocarbons
 1.5 parts by weight of N-cyclohexyl-2-benzothiazylsulfenamide
 2.1 parts by weight of sulfur
Vulcanization conditions: 30 minutes at 153° C.

Mixture C
 100 parts by weight of ethylene-propylene-terpolymer-rubber
 5 parts by weight of zinc oxide
 1 parts by weight of stearic acid
 10 parts by weight of naphthenic oil
 1 parts by weight of phenyl-β-naphthylamine
 75 parts by weight of gas carbon black
 1 parts by weight of Zn salt of 2-mercaptobenzothiazole
 2 parts by weight of tetramethyl thiarandisulfide
 1.5 parts by weight of sulfur
Vulcanization conditions: 30 minutes at 153° C.

Mixture D
 100 parts by weight of butyl rubber
 1 parts by weight of steric acid
 5 parts by weight of zinc oxide
 50 parts by weight of HAF carbon black
 1 parts by weight of dibenzothiazyldisulfide
 1.5 parts by weight of tellurium diethyldithiocarbamate
 1 parts by weight of sulfur
Vulcanization conditions: 30 minutes at 160° C.

Mixture E
 100 parts by weight of nitrile rubber (28% acrylonitrile)
 5 parts by weight of zinc oxide
 1 parts by weight of stearic acid
 10 parts by weight of HAF carbon black
 40 parts by weight of SRF carbon black
 70 parts by weight of ether-thioacetal plasticizer
 1 parts by weight of N-cyclohexyl-2-benzothiazylsulfenamide
 1.8 parts by weight of sulfur
Vulcanization conditions: 30 minutes at 153° C.

Mixture F
 100 parts by weight of nitrile rubber (39% acrylonitrile)
 1 parts by weight of stearic acid
 5 parts by weight of zinc oxide
 10 parts by weight of dioctyl phthalate
 55 parts by weight of SRF carbon black
 1.5 parts by weight of dibenzothiazyldisulfide
 0.25 parts by weight of tetramethylthiurandisulfide
 1.5 parts by weight of sulfur
Vulcanization conditions: 15 minutes at 153° C.

In the following Examples, under the term "tearing behaviour" the appearance is indicated after the peeling experiment. R signifies rupture in the elastomer, while the number before it indicates the percentage rate of tearing in the elastomer phase. M signifies that the binder has become detached from the metal. For example, the expression 10 R – 90M indicates that a 10 percent rupture in the elastomer and 90 percent detachment of the metal were observed.

The invention will be further described with reference to the following specific examples.

Example 1

Aluminium sheets degreased in trichloroethylene were coated with a 50 percent solution of the product of addition of 1 mol of crystalline triglycidyl isocyanurate to 3 mols of diphenylmethanediisocyanate in methylethylketone. After drying at room temperature, a transparent, firmly-adhering, very hard film resulted which even bending the sheet did not crack off from the foundation and on heating to 100° C was hardly altered. A solution of triphenylmethanetriisocyanate in methylene chloride applied in a similar way gave a violet film of uneven thickness, which on heating to 100° C softened very strongly, so that, on the vertically standing metal sheet, detached nose formation occurred.

Metal sheets from cold-rolled steel were blasted with chilled iron pyrites, degreased before and after the blasting in trichloroethylene vapor and coated with the first mentioned addition product composition. After drying, the sheets were bonded according to ASTM – D 429, Method B, to rubber mixture F utilizing a vulcanization in the press of 15 minutes at 153° C and a pressure of 40 Kp/cm². The rubber coating amounted to 2 mm. After storage of the test specimen for 24 hours at room temperature, the rubber coating was peeling off at an angle of 45°. The resistance to peeling amounted to more than 40 Kp per inch with complete fracture in the elastomer layer. Test bodies made in the same way were stored for 8 weeks at room temperature in xylene, petrol, ASTM-oil No. III (mixture of hydrocarbons) and cyclohexanone, without the joint being impaired. Further, they were stored in cyclohexanone for 4 days at 100° C and in ethyleneglycolmonomethylether for 24 hours at 100° C and in ASTM-oil No. III for 4 days at 100° C, also without the joint being impaired.

Example 2

The procedure was as in Example 1. Instead of the 50 percent solution, a 30 percent solution of the same triisocyanate in methylethylketone was used. The coated metal parts (a) immediately after the drying (30 minutes at room temperature) (b) after the drying and subsequent effect of saturated atmosphere (about 100 percent relative humidity) for 30 minutes at 40° C, were again bonded to the rubber mixture F. The peeling test gave in both cases complete fracture in the elastomer.

Example 3

The procedure was as in Example 1, but the coated metal parts after drying were stored for 1 day and 4 days respectively under normal room conditions, before they were bonded to the rubber mixture F. The peeling test again gave in both cases complete fracture in the elastomer.

Example 4

Mixtures were prepared which consisted of equal parts by weight of the product of addition of 1 mol of crystalline triglycidyl isocyanurate to 3 mols of diphenylmethanediisocyanate and in each case, one of the following substances:
a. polyester from adipic acid, hexanediol, propanediol and neopentylglycol (OH value 56, molecular weight about 2,000)
b. chlorinated rubber (about 67 percent chlorine)
c. Polyepichlorhydrin (molecular weight 1400)
d. Trimethylolpropane trimethacrylate
e. chlorinated ethylene-propylene-terpolymer-rubber (68 percent chlorine)

Approximately 10 percent solutions in methylethylketone were prepared from the mixtures and applied to the metal sheet prepared as in Example 1. The further preparation of the test specimen was also effected as in Example 1. The peeling experiment gave in all cases complete fracture in the elastomer layer.

Example 5

The following intimate mixture or solutions were prepared: 36 parts by weight of chlorosulfonated polyethylene (29% Cl, 1.25% S), 36 parts by weight of chlorosulfonated polyethylene (43% Cl, 1.8% S), 30 parts by weight of carbon black, 30 parts by weight of p-dinitrosobenzene, 14.3 parts by weight of zinc oxide, 70 parts by weight of trichloroethylene, 724 parts by weight of xylene, 57 parts by weight of a product of addition of 1 mol of crystalline triglycidyl isocyanurate to 3 mols of the following diisocyanates
a. toluylenediisocyanate (isomeric mixture)
b. 2,4-toluylenediisocyanate
c. isophoronediisocyanate.

As in Example 1, steel sheets were pretreated according to ASTM, D 429, Method B, brushed with binder and bonded to the rubber mixtures A, B and D. The thickness of the rubber layer was 5 mm in this and in all further Examples. The results of the tests are disclosed in Table I.

Table I

| Peeling strength (Kp/inch) | | | |
|---|---|---|---|
| Rubber mixture | A | B | D |
| Binder 5 a | 31ˣ | 74ˣ | 51 |
| Binder 5 b | 40 | 82 | 52 |
| Binder 5 c | 29 | 76 | 51 |

In all cases except the two marked x, the tearing behaviour was 100 R. Only in x it amounted to 98 R.

For comparison, in order to show the influence of the isocyanate addition product on the properties of the binders, the addition of the addition product used according to the invention was omitted. The following results of the peeling test in experiments with rubber mixtures A and B were obtained as shown in Table II.

Table II

| Rubber Mixture A | | Rubber Mixture B | |
|---|---|---|---|
| Kp/inch | Tearing behaviour | Kp/inch | Tearing behaviour |
| 21 | 10 R–90 M | 0 | 100 M |

Example 6

The following mixture was prepared: 70 parts by weight of chlorosulfonated polyethylene (43% Cl, 10% S), 17 parts of carbon black, 33 parts of p-dinitrosobenzene, 83 parts by weight of chlorinated polyphenyls, 46 parts by weight of the product of addition of 1 mol of crystalline triglycidyl isocyanurate and 3 mols of diphenylmethanediisocyanate, 520 parts of xylene and 230 parts by weight of trichloroethylene. The test specimen were prepared as described in Example 1 using rubber mixture E, a nitrile rubber mixture with a high proportion of a synthetic plasticizer, which possibly could be expected to destroy the bond according to the invention. The peeling test gave a peeling strength of 31 Kp/inch with complete fracture in the rubber.

Example 7

A mixture was prepared from: 71 parts by weight of chlorosulfonated polyethylene (34.5% Cl, 0.9% S), 28 parts by weight of carbon black, 14 parts by weight of zinc oxide, 28 parts by weight of p-dinitrosobenzene, 57 parts by weight of the product of addition of 1 mol of crystalline triglycidyl isocyanurate to 1 mol of diphenylmethanediisocyanate, 71 parts by weight of trichloroethylene and 724 parts by weight of xylene. The procedure was again as in Example 1, using the rubber mixture C based on ethylene-propylene-terpolymer-rubber. The peeling strength of the composite amounted to 48 Kp/inch. Rupture in the elastomer occurred (100 R).

The preceeding specific embodiments are illustrative of the practice of the invention. It is to be understood, however, that other expedients known to those skilled in the art or disclosed herein may be employed without departing from the spirit of the invention or the scope of the appended claims.

We claim:

1. An adhesion assistant or binder composition for use in the production of composite bodies by vulcanizing vulcanizable rubber mixture on a substrate which is stable under vulcanization conditions consisting essentially of (A) from 5 percent to 50 percent by weight of binder ingredients consisting essentially of (1) from 20 percent to 100 percent by weight of said binder ingredients of the reaction product of a solid crystalline triglycidyl isocyanurate having an epoxide oxygen content of at least 14 percent with 1 mol for each epoxide group in said triglycidyl isocyanurate of an organic diisocyanate free of other substituents capable of reacting with epoxide oxygen, said organic diisocyanate having the formula $$O=C=N - R - N=C=O$$

wherein R is a member selected from the group consisting of (1) alkylene having from four to 18 carbon atoms, (2) phenylene, (3) naphthylene, (4) diphenylenemethane, (5) diphenylene, (6) their lower alkylated derivatives, (7) their lower alkoxylated derivatives, (8) their amine substituted derivatives, (9) methylenecyclohexyl and (10) its lower alkylated derivatives, (2) from 0 to 50 percent by weight of said binder ingredients of a film-forming chlorinated polymer, (3) from 0 to 50 percent by weight of said binder ingredients of an active cross-linking agent, (4) from 0 to 20 percent by weight of said binder ingredients of tack producing compounds selected from the group consisting of chlorinated hydrocarbons and resins, and (5) from 0 to 25 percent by weight of said binder ingredients of inert reinforcement fillers, and (B) from 50 percent to 95 percent of inert organic solvents liquid at room temperature.

2. The composition of claim 1 wherein said crystalline triglycidyl isocyanurate has an epoxide oxygen content of at least 15 percent.

3. The composition of claim 1 wherein 100 percent of said binder ingredients is said reaction product (1).

4. The composition of claim 1 wherein said binder ingredients consists of from 20 to 90 percent by weight of said reaction product (1) and from 3 to 50 percent by weight of said film-forming chlorinated polymer (2).

5. The composition of claim 4 wherein said film-forming chlorinated polymer (2) is selected from the group consisting of chlorosulfonated polyalkylenes, chlorinated natural rubber, chlorinated polyisoprene, chlorinated polybutadiene and a chlorinated copolymerizate of ethylene, propylene and, optionally, a diene.

6. The composition of claim 1 wherein said binder ingredients consists of from 20 to 90 percent by weight of said reaction product (1), from 3 to 50 percent by weight of said film-forming chlorinated polymer (2), and from 0.5 to 20 percent by weight of said active cross-linking agent (3).

7. The composition of claim 6 wherein said active cross-linking agent is selected from the group consisting of poly-C-nitroso aromatic compounds, polyesters derived from an excess of a polyhydric alcohol with a polycarboxylic acid having an OH value of from 30 to 120, and acrylic acid and methacrylic acid esters of polyhydric alcohols having more than one ester group per molecule.

8. The composition of claim 7 wherein said active cross-linking agent is a di-C-nitroso aromatic compound.

* * * * *